United States Patent Office 3,436,423
Patented Apr. 1, 1969

3,436,423
PROCESS FOR PREPARING FORMALDEHYDE
Jakob Ackermann, Milan, Italy, assignor to Società Italiana Resine S.p.A., Milan, Italy
No Drawing. Filed June 27, 1966, Ser. No. 560,858
Claims priority, application Italy, July 2, 1965, 15,393/65
Int. Cl. C07c 45/00, 47/04
U.S. Cl. 260—606      2 Claims This invention relates to a novel process for preparing paraformaldehyde, particularly with the view to obtain the latter in a form suitable for the production of substantially pure gaseous monomeric formaldehyde.

Gaseous monomeric formaldehyde is a fundamental substance in the production of certain synthetic resins, such as polyacetals or polyoxymethylenes and is usually obtained by thermally decomposing paraformaldehyde in an inert non-volatile liquid carrier at a temperature of 175° to 200° C. The decomposition is to be carried out as rapidly as possible, because a slow decomposition rate gives rise to secondary-reaction products (primarily methanol and formic acid) due to the Cannizzaro-reaction. Such secondary-reaction products represent a loss of formaldehyde and, what is still more important, involve a subsequent costly purification process of the crude gaseous formaldehyde product containing them. Commercial, high-grade paraformaldehyde (i.e., a product containing at least ca. 90% paraformaldehyde) is difficult to decompose at a high rate which would be necessary to avoid harmful proportions of methanol and formic acid.

This invention is based on assumption that the desired high rate of thermal decomposition of paraformaldehyde is conditioned by the manner in which the latter has been obtained.

Thus, a primary object of this invention is to provide a process yielding a readily decomposable paraformaldehyde. A further object of this invention is to obtain a readily decomposable high-grade paraformaldehyde, i.e., a commercial product containing at least 90% by wt. paraformaldehyde capable of being quickly decomposed to gaseous monomeric formaldehyde containing negligible proportions of methanol and formic acid. A still further object of the invention is to obtain a readily decomposable paraformaldehyde with a high yield. Yet further objects and advantages of the invention will result from the following description.

"Formalin" or "formol" is a liquid essentially consisting of an aqueous solution of formaldehyde; the solution usually contains about 37–40% by wt. formaldehyde and has a B.P. of about 98° C. Formalin may be also made available as a concentrated solution, about proximal to solidification due to its high formaldehyde content.

According to one aspect of this invention, a readily decomposable paraformaldehyde is obtained by a process comprising intimately dispersing Formalin in an organic liquid medium which is practically immiscible with water and is inert and non-solvent with respect to paraformaldehyde, and evaporating water in vacuo from the resulting dispersion until a fine dispersion of solid paraformaldehyde in said medium is obtained.

The organic liquid medium can consist of aliphatic or aromatic hydrocarbons, esters of mono- and polyhydric aliphatic and aromatic acids, polyesters, polyepoxides and expoxidated oils. According to a specific aspect of this invention, the liquid hydrocarbon is selected among those conventionally used (or known as suitable) for thermally decomposing paraformaldehyde to gaseous monomeric formaldehyde, having a boiling point sufficiently in excess of the decomposition temperature of paraformaldehyde so as to not volatilize (or substantially volatilize) during the decomposition process. Hydrocarbons such as petrolatum, octadodecylbenzne, dioctylphthalate, isodecyladipate, diphenyl oxide and low mol. wt. polytetrahydrofurans are preferred. Thus, once the above-mentioned fine dispersion of solid paraformaldehyde in said medium is obtained in the process according to this invention, the dispersion is practically ready for use as "feed" to a decomposition reactor for obtaining gaseous monomeric formaldehyde.

The grade (titer) of the Formalin used as starting substance in this process is not critical; Formalin containing from 30% to 90% by wt. formaldehyde may be used.

According to a particular aspect of this invention, commercial Formalin (titer 37–40%) is concentrated in vacuo up to a concentration just below the solidfication point of the solution, whereupon the liquid organic dispersion medium is added and evaporation of water from the resulting emulsion is continued under energic agitation until the desired dispersion of solid paraformaldehyde in the substantially water-free medium is obtained. The titer of this dispersion can be varied at will, depending upon the permanence time in the reactor; a titer of 90–98% by wt. $CH_2O$ is usually desired and obtained. Titers exceeding 98% by wt., although easily obtainable by this process, are generally not desired because of a comparaitvely low depolymerization speed of such a highly concentrated product in the decomposer producing gaseous monomeric formaldehyde.

It is essential, during evaporation of water from the dispersion of Formalin, to maintain the liquid particles of the latter in finely subdivided (emulsified) condition in the dispersion medium. Evaporators equipped with a turbo-mixer are suitable to that end. Alternatively, evaporators of the "spray-drier" type can be used, operating at a temperature sufficient to evaporate water from the emulsion sprayed thereinto, a fine dispersion of solid paraformaldehyde in the organic dispersion medium being collected in a bottom section of the evaporator. Still alternatively, the evaporation of water can be carried out in the so-called "thin layer evaporator" (otherwise known as Louwa-evaporator). In the case of the "spray-drier" and "thin layer" evaporators, the emulsion of Formalin in the dispersion medium must be prepared apart in a suitable emulsifier associated with the evaporator, whereas in the case of evaporators equipped with a turbo-mixer (or equivalent means) the emulsion can be formed directly in the evaporator and maintained throughout the evaporation process.

The degree of vacuum in the evaporator is, preferably, below 100 mm. Hg. The vapours evolving in the evaporator are advantageously led through a condenser; an aqueous condensate is recovered in this manner containing a few percent formaldehyde in the form of Formalin, which may be recirculated to the process.

Example 1

3 liters petrolatum and 1 kg. commercial Formalin with a 39% by weight formaldehyde content are placed into a 10 liters multi-neck flask provided with a turbo-mixer.

The flask contents are heated by means of an oil bath adjusted at 120° C., the pressure being reduced to 30 mm. Hg. The vapors formed are lead through a splash guard before being condensed. After 40 minutes evaporation one further kg. commercial Formalin is added.

The additions of Formalin are repeated at the same time intervals till a total of 4 kgs. Formalin is reached. 40 minutes after the last addition the treatment is discontinued and the flask contents analysed. A very fine suspension of a very low tendency to separation of paraformaldehyde (95% $CH_2O$) in petrolatum is obtained 90% of the $CH_2O$ contained in the starting Formalin was found back in the form of paraformaldehyde.

The remaining formaldehyde is recovered from the condensed vapors as 6.5% Formalin.

The resulting paraformaldehyde can easily be degraded to 160° C. in its dispersing medium. A gaseous formaldehyde is obtained which contains 0.15% methanol, whereas the starting Formalin contained 3.2% $CH_3OH$ (with respect to $CH_2O$).

Example 2

The same apparatus as in Example 1 is used. 5 liters dioctylphthalate are placed into the flask followed by the addition of 2.5 kg. hot liquid Formalin with a 73% $CH_2O$ content which are added while stirring. The latter Formalin was prepared from commercial Formalin simply by vacuum concentration.

The temperature of the oil bath into which the flask containing the Formalin/dispersing medium is immersed, is 115° C., the pressure in the flask being 18 mm. Hg. After approximately 40 minutes the process is discontinued and the resulting suspension is submitted to analysis and a decomposition test.

For a control test paraformaldehyde was prepared according to the conventional process of the prior art (Walker "Formaldehyde" 3rd Edition, Reinhold Publ. Corp., page 153) wherein 73% hot liquid Formalin is placed into a mixer having two rotary arms rotating at different speeds in opposite directions. The mixer is jacketed and heated by the circulating hot oil. The pressure is maintained at 18 mm. Hg. The process is discontinued after about 90 minutes and the paraformaldehyde which is part in powder and granulated form, respectively, is analyzed and submitted to the decomposition test.

The decomposition test consists in determining the rate of composition of paraformaldehyde under given conditions; 400 ml. of a paraformaldehyde suspension in dioctylphthalate (DOP) are placed into a 800 ml. flask provided with a stirrer and submerged in an oil bath at 160° C. The product obtained by the process of the invention is already in the form of a dispersion; the control paraformaldehyde was dispersed with a quantity of DOP such that the weight ratio of paraformaldehyde to DOP was the same as with the product obtained by the process according to this invention. The latter dispersion was prepared in the same disperser as used by the process of the invention.

The paraformaldehyde is depolymerized and the resulting formaldehyde is removed in gas form. The residual paraformaldehyde contents are analytically determined after 15 to 30 minutes dwelling time.

The following table shows the results obtained by the process of the invention and the control process.

|  | Invention | Prior art (control) |
| --- | --- | --- |
| Paraformaldehyde yield with respect to the starting Formalin, percent | 97 | 78 |
| $CH_2O$ percent contents | 96 | 96 |
| Decomposition test: |  |  |
| Undecomposed paraformaldehyde after 15 minutes, percent | 30 | 55 |
| Undecomposed paraformaldehyde after 30 minutes, percent | (¹) | 10 |

¹ About 0.2.

Example 3

Paraformaldehyde is prepared continuously in a thin layer evaporator provided with a rotary mixer. The latter is fed with 20 parts/hr. hot Formal in of the following composition:

$CH_2O$ ----------------------------------percent-- 78
$H_2O$ --------------------------------------do---- 21.6
$CH_3OH$ ----------------------------------do---- 0.4
Formic acid ---------------------------------- traces and with 70 parts/hr. dioctylphtalate recirculated from the decomposition reactor (temperature about 130° C.).

The dwelling time in the thin layer evaporator is a few minutes; the pressure is 70 mm. Hg, heating being effected with live steam at 2 kg./sq. cm. 87 parts/hr. of a paraformaldehyde suspension and 3 parts/hr. dilute Formalin having an 8% $CH_2O$ content as a volatile product are obtained.

The paraformaldehyde suspension is conveyed to a decomposition reactor where a 93% by weight gaseous formaldehyde is obtained. The balance is steam and a small quantity methanol (about 0.12%). The formic acid is present by traces. The dioctylphtalate set free by the formaldehyde is recycled without cooling to the thin layer evaporator. The gaseous formaldehyde output with respect to the formaldehyde contained in the Formalin employed is 98%.

Example 4

Paraformaldehyde is prepared continuously by vacuum atomization, that is, by evaporation and polymerization under adiabatic conditions. The atomizer is of the "dual type" which can be fed with two different liquids. The axial section of the atomizer is fed with 30 parts/hr. hot liquid Formalin at 86%, its tangential section being fed with 70 parts/hr. dispersing medium at 130° C. The pressure at the atomizer inlet and outlet is 1,500 mm. Hg and 30 mm. Hg, respectively.

The dispersing liquid is the heavy fraction of alkyl benzenes obtained by alkylation of benzene with propylene tetramer. It essentially comprises didodecyl-benzene, pentadecyl- and octodecyl-benzene.

The droplets of the Formalin and dispersing liquid mixture are converted to a very fine suspension which is continuously withdrawn from the bottom of the reactor by means of a pump. 97 parts/hr. dispersion, in which paraformaldehyde is 94%, are obtained.

99% of the $CH_2O$ employed by the process is obtained in the form of finely dispersed paraformaldehyde.

Where it is desired to prepare a still higher grade paraformaldehyde, the resulting dispersion, in a preheated condition at about 110° C., and brought to 3 kg./sq. cm. pressure can be similarly conveyed through a further atomizer. The latter will yield a very fine dispersion exceeding 98% in $CH_2O$ content.

What I claim is:
1. A process for preparing gaseous monomeric formaldehyde which comprises:
   forming an emulsion of Formalin in an organic liquid carrier, said carrier being substantially immiscible with water, inert and a non-solvent with respect to paraformaldehyde, and substantially non-volatile at a temperature of 175° C., heating said emulsion in vacuo and evaporating water from the emulsion until a fine dispersion of solid paraformaldehyde particles in said carrier medium is obtained and passing said dispersion through a decomposition reactor maintained at a temperature of about 175° C. to 200° C. to thereby decompose the paraformaldehyde particles to gaseous monomeric formaldehyde.
2. Process according to claim 1, wherein the organic liquid carrier medium is selected from the group consisting of: petrolatum, octadodecylbenzene, dioctylphthalate, isodecyladipate, diphenyl oxide, and low molecular weight polytetrahydrofurans.

References Cited

UNITED STATES PATENTS

| | | | |
|---|---|---|---|
| 3,351,668 | 11/1967 | Junkermann et al. | 260—615.5 |
| 3,000,960 | 9/1961 | Wheeler et al. | 260—606 |
| 2,481,981 | 9/1949 | Craven | 260—615.5 |

FOREIGN PATENTS 994,398  6/1965  Great Britain.

BERNARD HELFIN, *Primary Examiner.*

R. H. LILES, *Assistant Examiner.*

U.S. Cl. X.R.

260—615.5